United States Patent [19]

Chen et al.

[11] Patent Number: 5,741,609
[45] Date of Patent: Apr. 21, 1998

[54] ELECTROCHEMICAL CELL AND METHOD OF MAKING SAME

[75] Inventors: Dong Chen, Duluth; Anaba A. Anani, Lawrenceville; Zhenhua Mao, Duluth, all of Ga.

[73] Assignee: Motorola, Inc., Schaumburg, Ill.

[21] Appl. No.: 684,758

[22] Filed: Jul. 22, 1996

[51] Int. Cl.[6] .................................................. H01M 10/40
[52] U.S. Cl. ........................... 429/192; 429/212; 29/623.4
[58] Field of Search .............................. 427/410, 208.4; 429/137, 212, 192; 29/623.4

[56] References Cited

U.S. PATENT DOCUMENTS

| | | | |
|---|---|---|---|
| 5,240,790 | 8/1993 | Chua et al. | 429/192 X |
| 5,437,692 | 8/1995 | Dasgupta et al. | 29/623.1 |
| 5,464,707 | 11/1995 | Moulton et al. | 429/212 |
| 5,470,357 | 11/1995 | Schmultz et al. | 429/192 X |

*Primary Examiner*—Stephen Kalafut
*Attorney, Agent, or Firm*—Kenneth M. Massaroni; Kelly A. Gardner

[57] ABSTRACT

An electrochemical cell 22 comprises first and second electrode assemblies 10 and 24. Disposed between the electrode assemblies 10 and 24 is a layer of an electrolyte material 32. The electrode assemblies are adhered to the electrolyte layer by means of a adhesive layers 20 and 30 disposed between layers of electrode material 12 and 26 and the layer of electrolyte active material. The layer of adhesive material may be made of any of a number of materials, examples of which include polymers, epoxies, resins, and combinations thereof.

16 Claims, 4 Drawing Sheets

ELECTROCHEMICAL CELL AND METHOD OF MAKING SAME

TECHNICAL FIELD

This invention relates in general to the field of electrochemical cells and more particularly to methods for assembling such cells for enhanced mechanical integrity.

BACKGROUND OF THE INVENTION

There has been an great deal of interest in developing better and more efficient methods for storing energy for applications such as radio communication, satellites, portable computers and electric vehicles to name but a few. There have been recent concerted efforts to develop high energy cost effective batteries having improved electrochemical performance characteristics, particularly as compared to the prior art battery systems.

Rechargeable or secondary cells are typically more desirable than primary or nonrechargeable cells since the associated chemical reactions which take place at the positive and negative electrodes of the battery are reversible. Electrodes for secondary cells are capable of being recharged or regenerated many times by the application of an electrical charge thereto. Numerous advanced electrode systems have been developed for storing electrical charge. Concurrently, much effort has been dedicated to the development of processes capable of efficiently and economically producing such cells at throughputs which make the cost of such cells economically viable.

The current state of the art with respect to battery technology is the lithium ion battery cell. Lithium ion cells typically have a positive electrode or cathode which is fabricated of a lithiated transition metal oxide material such as $LiCOO_2$ or $LiMnO_2$. The negative electrode or anode has typically a lithium alloying material capable of reversibly intercalating lithium, such as petroleum, coke, or graphite. Current lithium ion cells have a layer of a separator material such as polypropylene disposed between the anode and the cathode. The separator material is then soaked as is both the anode and cathode with a liquid electrolyte such as $LiPF_4$ in an aprotic solvent. The anode, cathode, and separator are then wound into a jellyroll configuration as is known in the art and then placed in a stainless steel can which is sealed with an end cap. While cells such as these have found increasing acceptance in the marketplace due to their enhanced electrochemical properties, they are nonetheless limited by the fact they must be placed in stainless steel cans. These cans whether cylindrical or prismatic, are substantial limiting factor on the flexibility that design engineers have with respect to designing new and improved form factors for various portable products.

In an effort to provide more flexible and thinner cells, substantial effort has been made to produce a new type of lithium based cell known as the lithium polymer cell. Such cells rely on solid-state or gel electrolytes functioning as both the separator between the anode and the cathode material, as well as the electrolyte active species. Flexible non-aqueous battery cells such as this may then be packaged in a pouch affording tremendous design flexibility as well as substantially reducing the size and the weight of the battery package itself. Heretofore, flexible pouch type battery cells have not been tremendously successful due to the fact that gel electrolytes have not been able to maintain sufficiently intimate contact between the active surfaces of the anode, electrolyte, and cathode. This was not the case in prior art cells since the winding process provided a tight fit between the cells as well as intimate contact between the liquid electrolyte and the active anodes and cathodes. It is believed that until such time as sufficient intimacy is maintained between the anode, electrolyte and the cathode, that pouch type cells will be characterized by inferior electrochemical performance as compared with current lithium ion type cells.

Accordingly, there exists a need for a new method by which to assemble electrodes and electrolytes in electrochemical cells so as to maintain a sufficient level of intimacy therebetween. The process should be highly repeatable and easily implemented with existing materials used in electrochemical cells.

DETAILED DESCRIPTION OF THE PREFERRED EMBODIMENT

Figure 1:
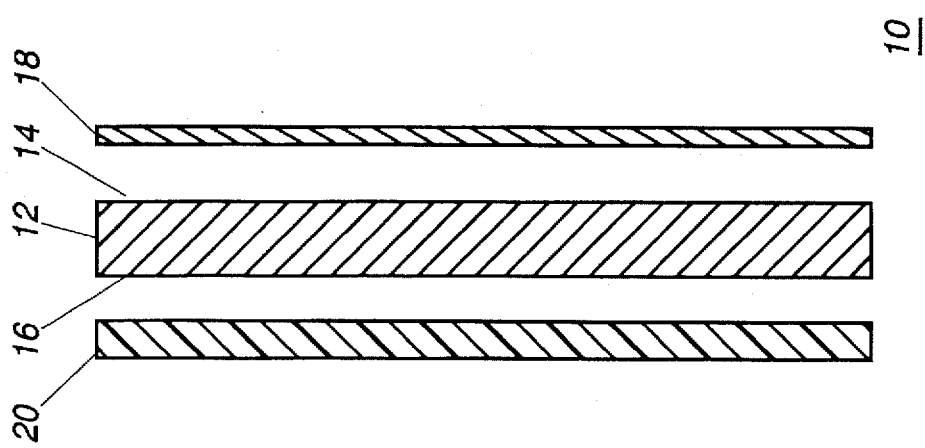
FIG. 1 is an exploded side view of an electrode assembly for use in an electrochemical cell, in accordance with the instant invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein an electrode assembly for an electrochemical cell, in accordance with the instant invention. The electrode assembly 10 includes a layer of an electrode active material 12 having first and second major surfaces 14 and 16. The electrode assembly, whether positive or negative, are preferably less than about 500 microns (μm) (0.5 mm), and most preferably less than 300 μm thick. The electrode assembly illustrated in FIG. 1 may be either the anode or the cathode of an electrochemical cell. In the embodiment in which the electrode assembly is used in a lithium rechargeable electrochemical cell, and wherein the electrode assembly 10 is the cathode, the layer of electrochemically active electrode material 12 is preferably fabricated of a lithiated transition metal oxide material. Examples of such material include lithiated cobalt oxide, lithiated manganese oxide, and lithiated nickel oxide. In one preferred embodiment, the electrode active material 12 is a lithiated nickel oxide such as that disclosed in commonly-assigned copending U.S. patent application Ser. No. 08/315,782 to Mao, et al filed Oct. 3, 1994 and U.S. patent application Ser. No. 08/663,415, filed Jun. 17, 1996.

Alternatively, if the electrode assembly 10 is the anode or negative electrode of an electrochemical cell, electrode active layer 12 is preferably formed of a lithium alloy element such as lithium metal, lithium aluminum, aluminum, or an activated carbon material such as graphite or petroleum coke. In one preferred embodiment, the material may be fabricated of pyrrolitic decomposition product of multi-functional organic monomers or a lignin material.

Examples of such materials are disclosed and claimed in common-assigned copending U.S. patent application Ser. Nos. 08/575,653 entitled "ELECTRODE MATERIALS FOR ELECTROCHEMICAL CELLS AND METHOD OF MAKING SAME" to Zhang, et al; and application Ser. No. 08/660,320 filed Jun. 7, 1996 entitled "AMORPHOUS CARBON ELECTRODE MATERIALS FOR ELECTROCHEMICAL CELLS AND METHOD OF MAKING SAME", to Zhang, et al, the disclosures of which are incorporated herein by reference.

Disposed on the first major surface 14 is a layer of a current collecting material 18 adapted to collect any current or charge carriers generated by the layer of electrode active material. In the embodiment in which layer 12 is a transition metal oxide, current collecting layer 18 is preferably formed, for example, aluminum. Alternatively, in the embodiment in which the layer of electrode active material 12 is fabricated so as to be the anode of the lithium rechargeable cell, layer 18 may instead be fabricated of a material selected from the group of copper, nickel, nickel alloys, and combinations thereof.

Disposed on second major surface 16 is a layer of an adhesive material 20. The layer of adhesive material is provided so as to assure intimate contact between the layer of electrode active material 12 and a layer of electrolyte material (shown in FIG. 2). The layer of adhesive material may be a thin, flexible sheet, fabricated of any of a number of different materials, examples of which include polymers, epoxies, resins, and combinations thereof. In one preferred embodiment, the layer of adhesive material is a polymeric adhesive material fabricated of a polymer selected from the group of polyurethane, poly(vinylidene fluoride), poly(ethylene oxide), ethylene propylene diene monomers, poly(propylene oxide), and combinations thereof. It is to be understood that the layer of adhesive material, whether polymeric or otherwise, may include therein the electrolyte active species as described hereinbelow. That is, the adhesive material may be porous in that the electrolyte active species may be absorbed thereinto the adhesive material thus enhancing the ionic conductivity of the adhesive material. It is also to be noted that the adhesive material is preferably electrically insulating. The layer of adhesive material 20 may be fabricated of any of a number of known processes, examples of which include solvent casting, extrusion, spray coating, or coating from a slurry as by a doctor blade.

Figure 2:
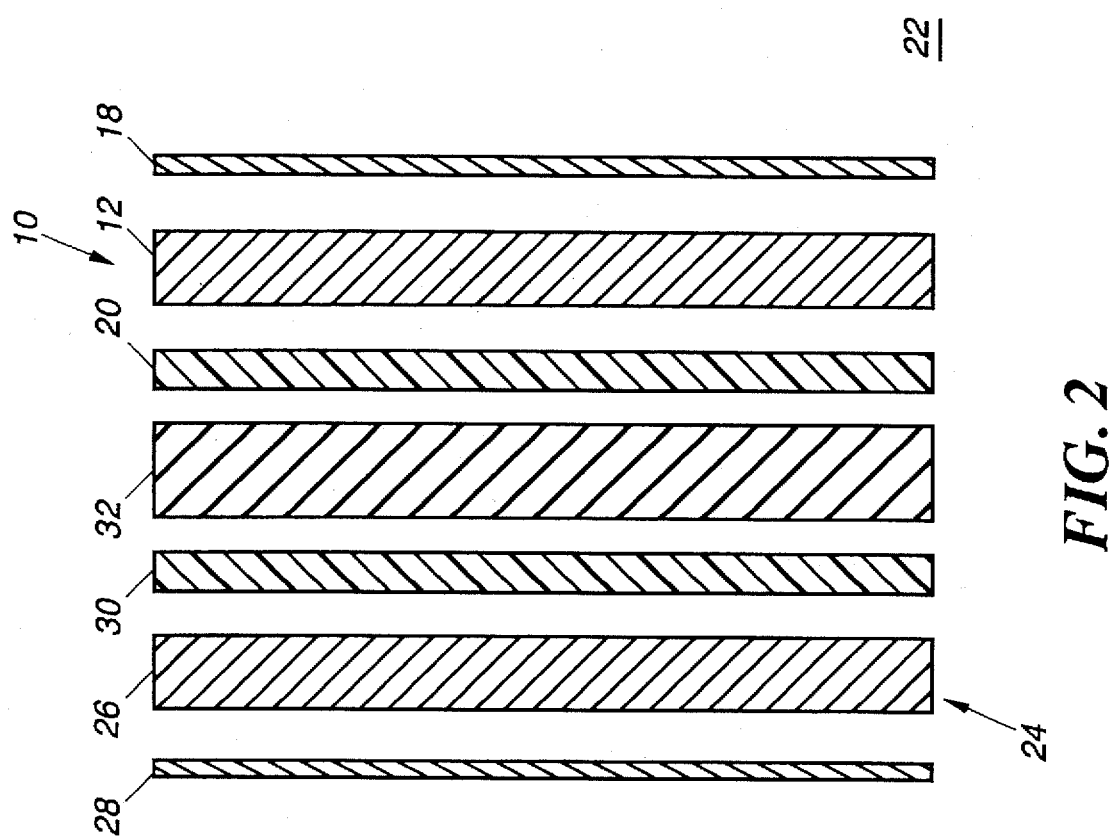
FIG. 2 is an exploded side view of an electrochemical cell in accordance with the instant invention.

Referring now to FIG. 2, there is illustrated therein an electrochemical cell 22 comprising a first electrode assembly 10 and a second electrode assembly 24. Electrode assembly 10 is similar to that described with respect to FIG. 1, and hence includes a layer of electrode active material 12, a layer of a current collecting material 18 and a layer of adhesive material 20. Second electrode assembly 24 likewise includes a layer of an electrode active material 26, a layer of a current collecting material 28 and a second layer of an adhesive material 30. In operation, one electrode assembly, for example, electrode assembly 10 would be a cathode assembly while electrode assembly 24 would be an anode assembly. In the embodiment in which the electrochemical cell 22 is a lithium rechargeable electrochemical cell, then the layers of electrode active material and current collecting material would be as set forth hereinabove. It is important to note however that the subject invention is not so limited. The electrochemical cell 22 illustrated in FIG. 2 may be equally applicable for any type of rechargeable or primary electrochemical cell, examples of which include lead acid, zinc, nickel cadmium, nickel metal hydride, or lithium primary cells.

Disposed between electrode assemblies 10 and 24 is a layer of electrolyte material 32. The electrolyte layer 32 may also be adapted to act as a separator between electrode subassemblies 10 and 24. In this regard, the layer 32 should have a high degree of mechanical integrity, while being electrically insulating and ionically conducting. In this regard, the electrolyte layer 32 may be a polymeric material such as polyethylene oxide, polypropylene, polyethylene, poly(vinylidene), and combinations thereof, and have impregnated or dispersed therein an electrolyte active species. Examples of the electrolyte active species that are typically used in a lithium rechargeable cell include a lithium salt disposed in an aprotic solvent. The electrolyte active species absorbed by the polymer in layer 32 is selected to optimize performance of the positive and negative electrode coupled. For a lithium type cell the lithium electrolyte absorbed by the layer is typically a solution of an alkaline metal salt or combinations of salts dissolved in an aprotic organic solvent or solvents. Typical alkaline metal salts include, but are not limited to, salts having the formula $M^+X^-$ where $M^+$ is an alkaline metal cation such as $Li^+$, $Na^+$, $K^+$ and combinations thereof; and $X^-$ is an anion such as $Cl^-$, $Br^-$, $I^-$, $ClO_4^-$, $BF_4^-$, $PF_6^-$, $ASF_6^-$, $SBF_6^-$, $CH_3CO_2^-$, $CF_3SO_3$—$(CF_3O_2)2^N-$, $(CGP_3SO_2)_2N-$ and combinations thereof. Aprotic organic solvents include but are not limited to propylene carbonate (PC), ethylene carbonate (EC) diethyl carbonate (DEC), dimethyl carbonate, dipropyl carbonate, dimethyl sulfoxide, acetonitrile, dimethoxyethane, tetrahydrofuran, N-methyl-2-pyrrolidone (NMP) and combinations thereof. For other electrode combinations, other electrolyte active species may be preferred, such as KOH, for a Nicad or nickel metal hydride system.

The layers of adhesive materials 20 and 30 illustrated in FIG. 2 may likewise be impregnated or otherwise have dispersed therein the electrolyte active species described hereinabove. When the electrolyte active species is dispersed in the adhesive material, the adhesive serves the purpose of both adhering the electrode active material layers 12 and 26, to the electrolyte layer 32, and enhancing the electrolyte performance of the electrolyte layer 32. Indeed, due to the adhesive nature of layers 20 and 30, a good and uniform interfacial contact is formed between the electrode assemblies and the layer of electrolyte active material disposed therebetween. As noted above, intimate contact between such layers is critical for an electrochemical cell which will demonstrate characteristics consistent with those necessary to make a product successful in the marketplace.

Good adhesion between the layers as well as intimate contact therebetween may be enhanced by compressing the anode assembly and the cathode assembly after they are arranged in stacked configuration with the layer of electrolyte material therebetween. Compression may also be carried out in the presence of heat so as to partially dissolved and then subsequently reform the layer of adhesive material. In this regard, the heat applied is typically between 50° and 150° and preferably about 95° to 100° C.

An electrochemical cell was made according to the process and description provided hereinabove. This cell may be better understood from a perusal of the following examples.

EXAMPLE I

A composite negative electrode containing commercially available carbon active material (MCMB 25/28 graphite) was coated onto a copper current collector by the solvent casting technique to form the negative electrode assembly. A composite positive electrode containing LiNiO$_2$ active material, fabricated according to the copending application Ser. No. 08/315,782, was coated onto a positive electrode current collector with an adhesive polymerlayer disposed thereover. The adhesive polymer used was polyurethane. The coating was done by forming a layer of film from a viscous paste containing the adhesive polymer dissolved in a solvent without the liquid electrolyte active species. The solvent used was tetrahydrofuran (THF). The two electrode assemblies were used to sandwich a polypropylene separator, with the sides containing the viscous paste facing the separator element so as to form a contiguous Cu/electrode/adhesive/separator/adhesive/electrode/Al cell assembly.

Figure 3:
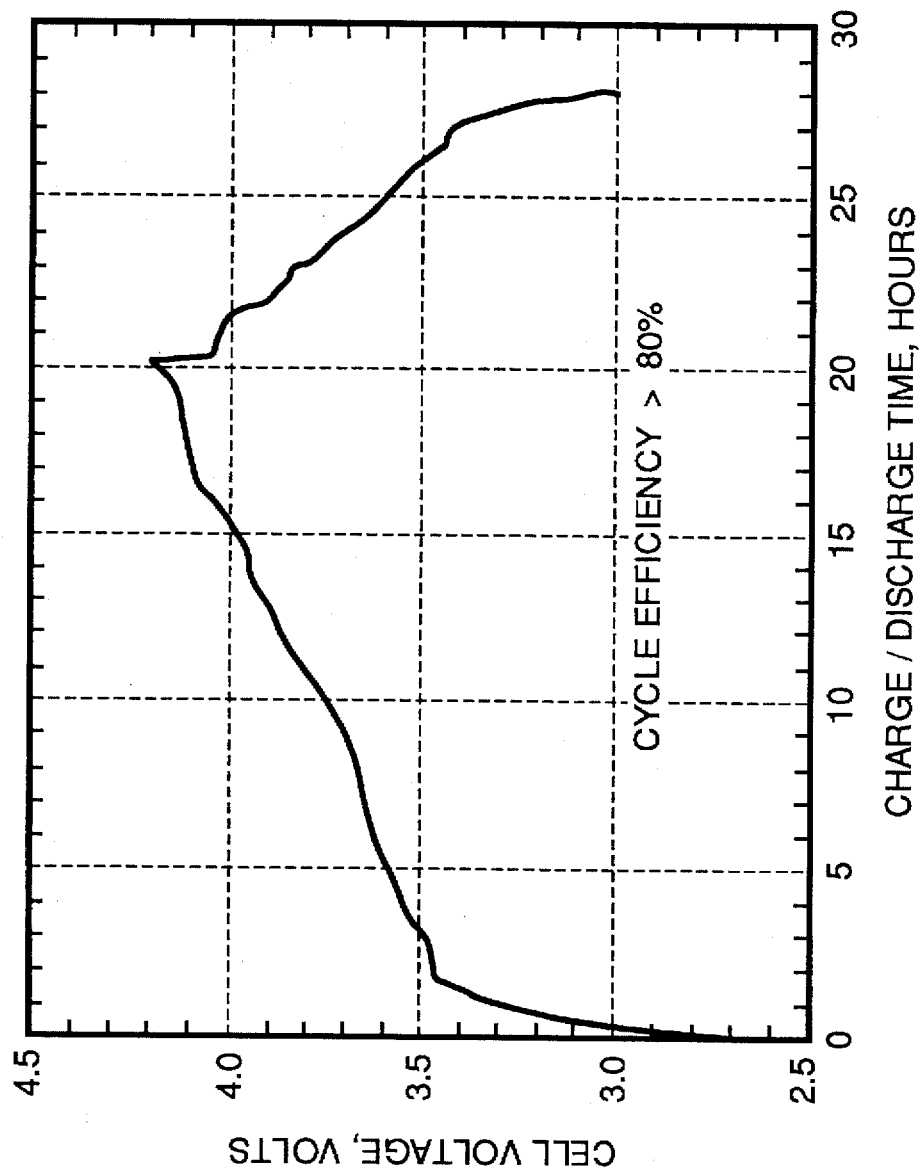
FIG. 3 is a chart illustrating first cycle efficiency for an electrochemical cell in accordance with the instant invention.
Figure 4:
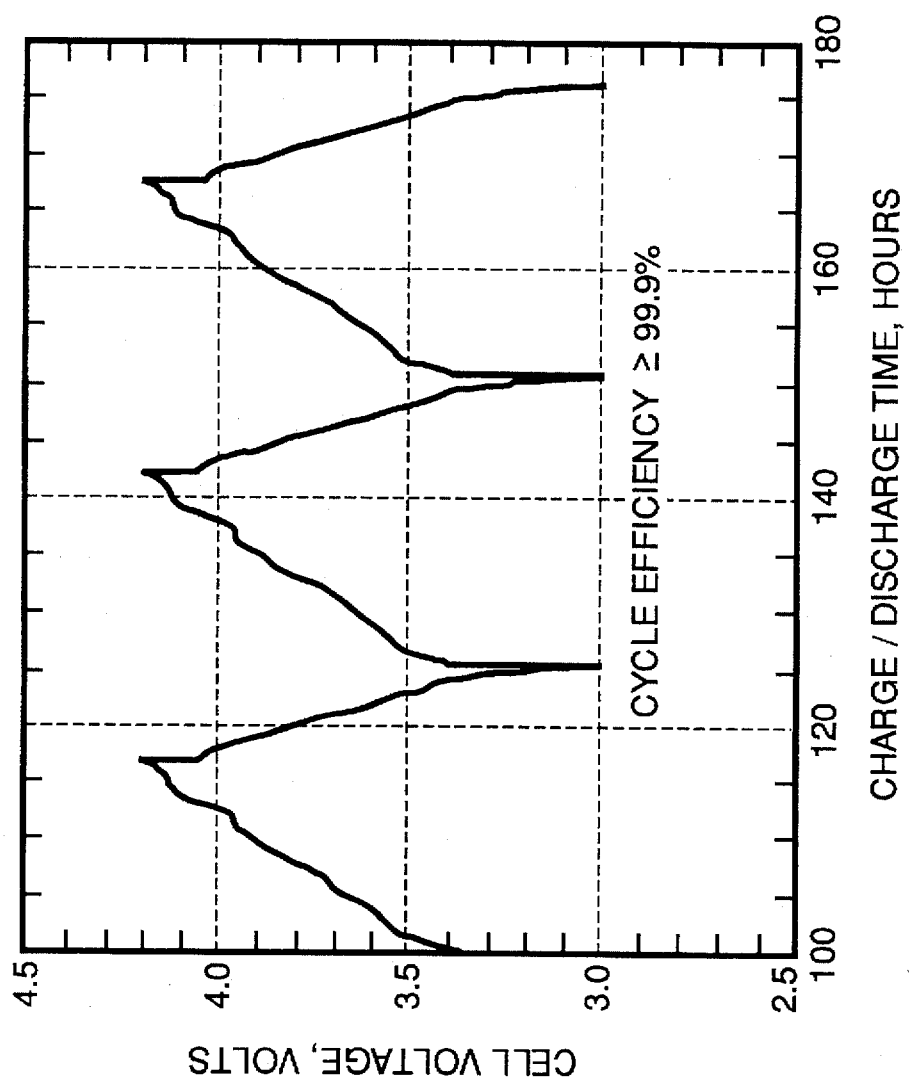
FIG. 4 is a series of charge/discharge curves illustrating cycle efficiency for an electrochemical cell in accordance with the instant invention.

Upon evaporation of the THF solvent, the cell assembly was then soaked in a liquid electrolyte containing PC/EC/DEC and LiBF$_4$ as the conducting salt. FIGS. 3 and 4 illustrate the electrochemical performance of this device. Specifically, FIG. 3 illustrates that the device has a first charge efficiency of approximately 80%. FIG. 4 is a charge discharge characteristic of a cell assembled according to the illustrated example. The result shows that the coloumbic efficiency (the ratio of discharge capacity to charge capacity for a given cycle) was over 99%.

EXAMPLE II

Positive and negative electrodes as described in EXAMPLE I were prepared. Both the negative and positive electrode assembly were coated on the side opposite the current collector, with an adhesive polymer. The adhesive polymer used was polyurethane. The coating was done by forming a layer of film from a viscous paste containing the adhesive polymer dissolved in a solvent containing a lithium ion conducting liquid electrolyte. The solvent used was tetrahydrofuran (THF), and the liquid electrolyte was a LiBF$_4$ salt in PC/EC/DEC. The two electrode assemblies were used to sandwich a polypropylene separator, with the sides containing the viscous paste facing the separator element so as to form a contiguous Cu/electrode/adhesive/separator/adhesive/electrode/AL cell assembly. Upon evaporation of the THF solvent, the cell assembly was then soaked in a liquid electrolyte containing PC/EC/DEC and LiBF$_4$ as the conducting salt. The charge discharge characteristics of this cell was identical to that obtained from the cell assembled according to Example I.

EXAMPLE III

Positive and negative electrodes as described in Example I were prepared. Both the negative and positive electrode assembly were coated on the side opposite to the current collector, with an adhesive polymer. The adhesive polymer used was polyurethane. The coating was done by forming a layer of film from a viscous paste containing the adhesive polymer dissolved in a solvent without liquid electrolyte. The solvent used was tetrahydrofuran (THF). The electrolyte layer was a super absorbent polymer prepared according to U.S. patent application Ser. No. 08/251,066 filed May 31, 1994. The two electrode assemblies were used to sandwich the electrolyte layer with the sides containing the viscous paste facing the electrolyte layer element so as to form a contiguous Cu/electrode/adhesive/separator/adhesive/electrode/AL cell assembly. Upon evaporation of the THF solvent, the cell assembly was then soaked in a liquid electrolyte containing PC/EC/DEC and LiBF$_4$ as the conducting salt. Upon electrolyte absorption, the electrolyte system acted as the ion transporting electrolyte medium for the solid state cell. The assembled cell yielded excellent adhesion at the electrode/adhesive and electrolyte/adhesive interfaces.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An electrochemical cell having electrode material capable of reversible intercalating and de-intercalating lithium ions, said cell comprising a first and a second electrode assembly, each electrode assembly having a thickness of less than about 300 μm, an electrolyte layer disposed between said first and second electrode assemblies, and an ionically conducting adhesive layer operatively disposed between said electrolyte layer and at least one of said electrode assemblies.

2. An electrochemical cell as in claim 1, further including an adhesive layer operatively disposed between each said electrode assembly and said electrolyte layer.

3. An electrochemical cell as in claim 1, wherein said electrode assemblies, said adhesive layers, and said electrolyte layer is assembled to form said cell in the absence of an electrolyte active species, subsequent to which assembly the electrolyte active species is introduced into said cell.

4. An electrochemical cell as in claim 3, wherein said electrolyte active species comprises a lithium salt and an aprotic organic solvent.

5. An electrochemical cell as in claim 1, wherein said adhesive is a polymeric adhesive.

6. An electrochemical cell as in claim 1, wherein said adhesive is a polymeric adhesive selected from the group of polyurethane, polyethylene oxide, polypropylene, polyethylene, poly(vinylidene fluoride), and combinations thereof.

7. An electrochemical cell as in claim 1, wherein the concentration of the electrolyte active species is substantially the same throughout said electrolyte layer and said adhesive layers.

8. An electrode assembly for an electrochemical cell, said electrode assembly comprising:
   a layer of an electrode active material having first and second major surfaces and a thickness of less than 300 μm;
   a layer of a current collecting material disposed on said first major surface; and
   a layer of an ionically conducting, electrically insulating adhesive material disposed on said second major surface.

9. An electrode assembly as in claim 8, wherein said adhesive layer is a polymeric adhesive material.

10. An electrode assembly as in claim 9, wherein said polymeric adhesive material is selected from the group of polyurethane, polyethylene oxide, polypropylene, polyethylene, poly(vinylidene fluoride), and combinations thereof.

11. An electrode assembly as in claim 8, further including an electrolyte active species that has been dispersed within said adhesive material after assembly of the electrochemical cell.

12. An electrode assembly as in claim 11, wherein said electrolyte active species comprises a lithium salt and an aprotic organic solvent.

13. A method of forming an electrochemical cell comprising the steps of:

providing a cathode assembly and an anode assembly, each including at least a layer of an electrochemically active material and a current collector, said anode and cathode assemblies being less than about 300 µm thick;

providing a layer of an electrically insulating, ionically conducting electrolyte material between said anode assembly and said cathode assembly; and providing a layer of an adhesive material between said electrolyte material and one of said anode assembly and cathode assembly.

14. A method as in claim 13 include the further step of providing a layer of adhesive material between both the anode assembly and the electrolyte materials and the cathode assembly and the electrolyte material.

15. A method as in claim 13 wherein the adhesive material is selected from the group of polyurethane, polyethylene oxide, polypropylene, polyethylene, poly(vinylidene) fluoride, and combinations thereof.

16. A method as in claim 13 wherein the adhesive material further includes an electrolyte active species dispersed therein.

* * * * *